April 30, 1968
R. J. JIMENEZ
3,381,128
SERIALOGRAPH WITH SPACED CARRIERS FOR MOVABLE
X-RAY FILM CASSETTES IN SHIELDED TRAYS
Filed May 20, 1965
5 Sheets-Sheet 1
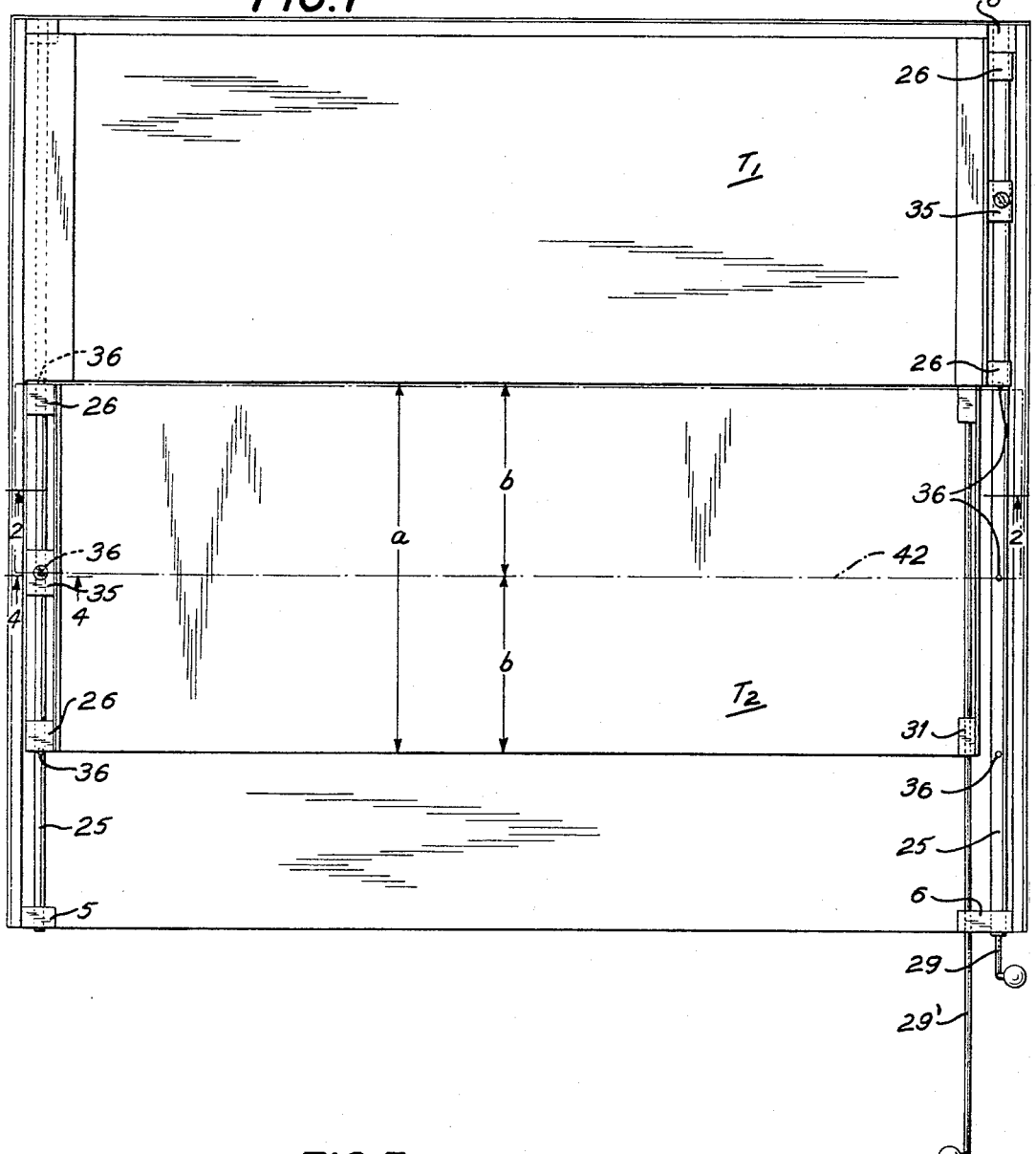
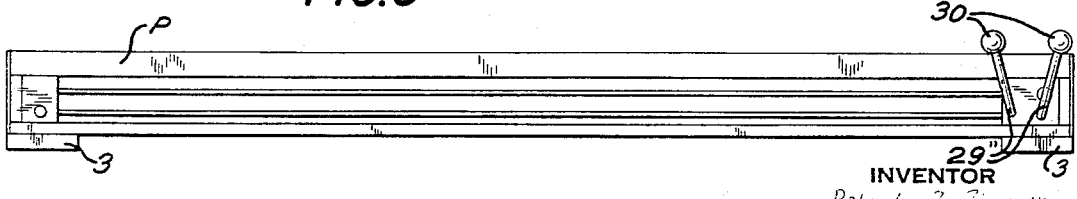
INVENTOR
Roberto J. Jimenez
BY
Michael J. Strike
ATTORNEY INVENTOR
Roberto J. Jimenez
BY
Michael J. Striker
ATTORNEY

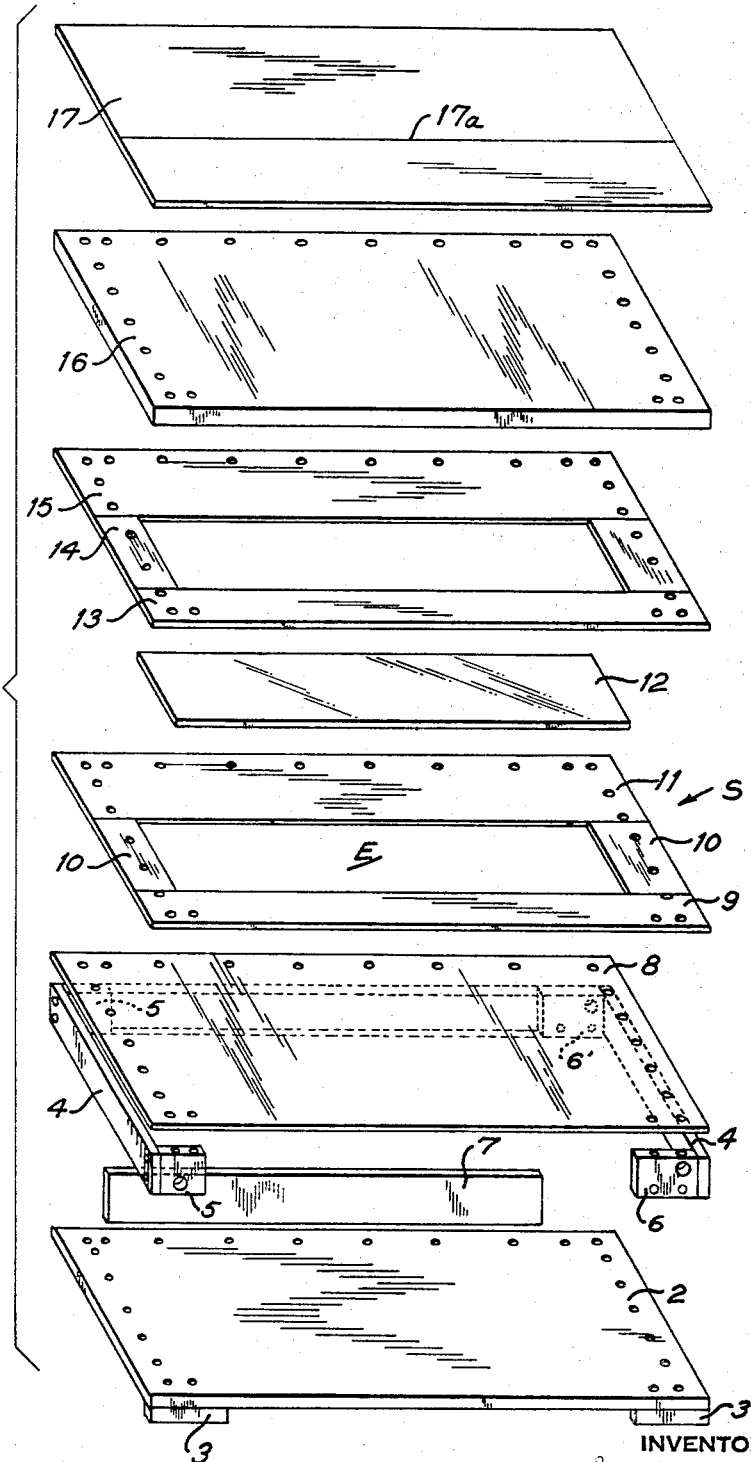

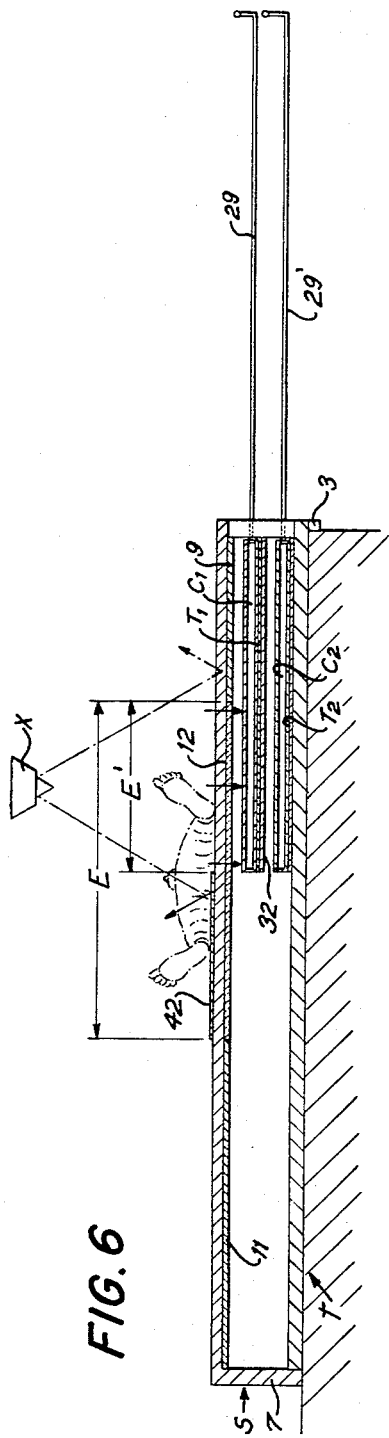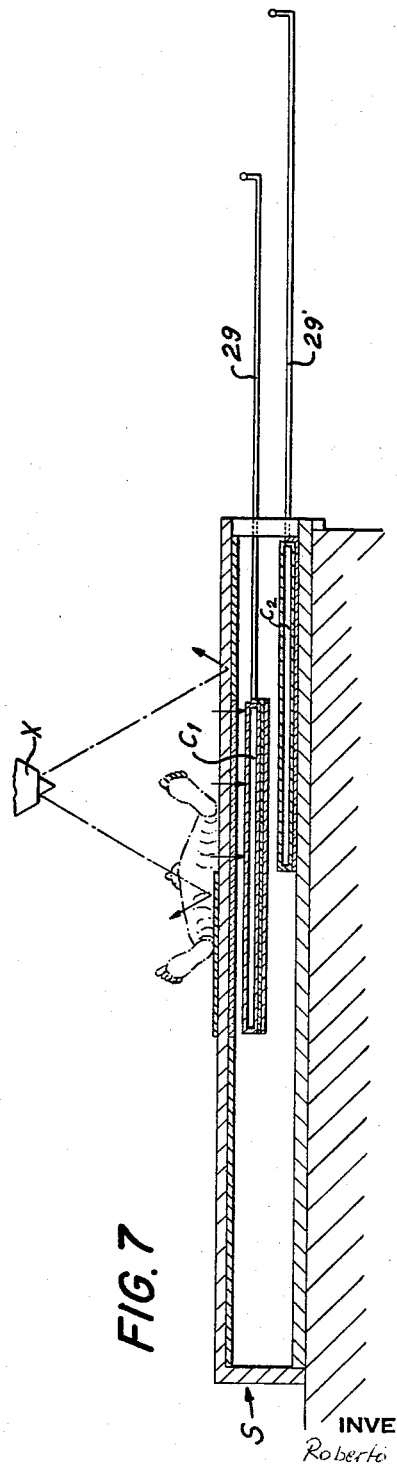

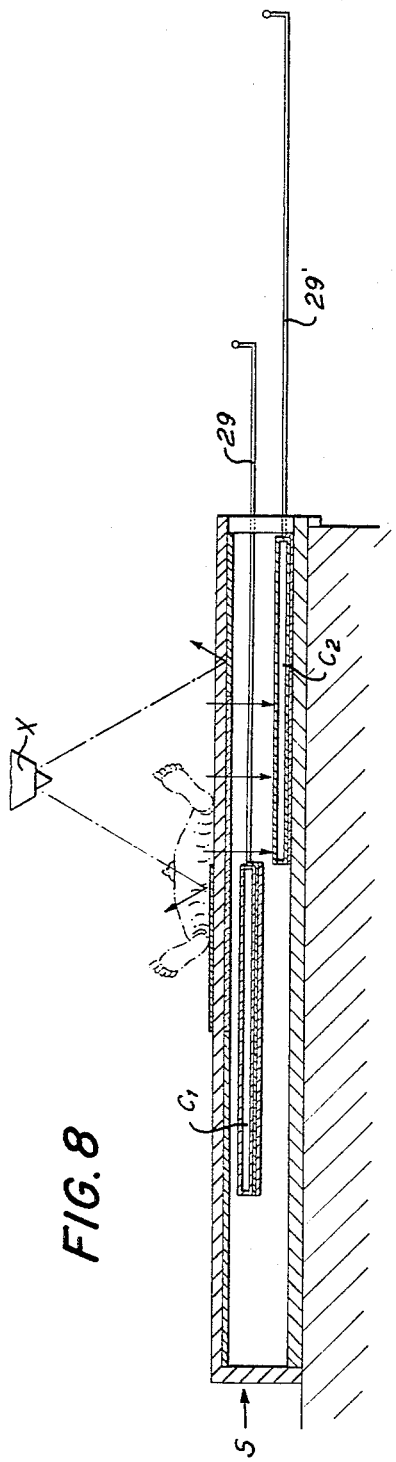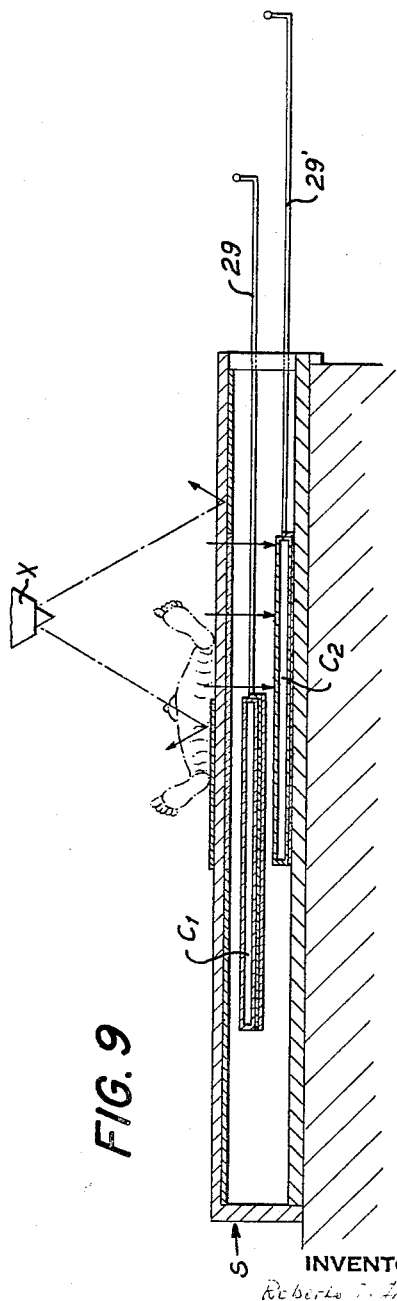

3,381,128
SERIALOGRAPH WITH SPACED CARRIERS
FOR MOVABLE X-RAY FILM CASSETTES
IN SHIELDED TRAYS
Roberto J. Jimenez, 20 Washington Ave., Apt. 2-A,
Santurce, Puerto Rico
Continuation-in-part of application Ser. No. 170,077,
Jan. 31, 1962. This application May 20, 1965, Ser.
No. 457,458
The portion of the term of the patent subsequent to
June 8, 1982, has been disclaimed
12 Claims. (Cl. 250—66)

The present application is a continuation-in-part application of the copending application filed with the same title and under the Ser. No. 170,077 on Jan. 31, 1962.

The present invention relates to serialographs capable of taking a plurality of X-rays in a given sequence at desired intervals.

Serialographs are particularly suitable for making X-rays of arteries as well as to indicate the flow of blood along the arteries. Thus, as is well known, a suitable dye is injected into the blood stream in the particular artery which is to be photographed, and a series of X-rays taken at predetermined intervals of a particular area will demonstrate the flow of the dye along the artery so as to indicate to the physician whether or not there is a constriction, for example, impeding the flow of blood along the artery. The present invention facilitates the making of similar studies of veins and lymphatics over extensive areas of the body.

Conventional serialographs suffer from several defects. In the first place, they are exceedingly complicated and expensive requiring, for example, electronic controls, and aside from the cost and complexity of this equipment, it is subject to frequent breakdowns and must be set up for use in a particular location. Skilled personnel is required to operate such apparatus, and it is therefore not readily available under all conditions.

It is a primary object of the present invention to provide a simple, inexpensive serialograph which is at the same time portable so that the serialograph of the invention may be easily transported to any desired location.

It is a further object of the present invention to provide a serialograph of the above type which is exceedingly simple to operate and which can be used in extremely limited space without any difficulties, so that the serialograph of the invention may, for example, be used in even the smallest X-ray rooms.

Still another object of the present invention is to provide a serialograph which while being simple, inexpensive, and easily portable, at the same time is capable of handling a series of relatively large cassettes, so that it is possible with the serialograph of the invention to make exposures of relatively large parts of the body such as the entire lower abdomen from above the level of the umbilicus, and both lower extremities to the ankles, for example.

It is a further object of the invention to provide a serialograph of the above type which can be operated in a number of different ways giving an extremely flexible use of the apparatus of the invention enabling different types of X-ray procedures to be performed with the same serialograph and enabling two cassettes to be successively fully or partially exposed so that, if desired, one X-ray film, 14″ x 36″, located in each cassette may be exposed at once or only part of the film may be exposed depending on the position of the respective cassette, obtaining thereby a plurality of X-rays with each cassette.

It is yet an additional object of the present invention to provide a serialograph of the above type in which each cassette can be easily shifted between the various positions thereof and in which an appropriate part of the cassette can be properly located and be releasably locked in an exposure position in which an appropriate part of the film in the cassette may be exposed depending on the position of the cassette.

With these objects in view, the serialograph of the present invention mainly comprises frame means, shielding means having an area at least equal to that of the cassette to be used in the serialograph and being carried by the frame means extending in a first plane and arranged to define laterally of the shielding means an exposure area, first shifting means adapted to carry a cassette and being mounted in the frame means in a second plane parallel to the first plane, second shifting means adapted to carry a second cassette and being mounted in the frame means in a third plane parallel to the second plane, guide means on the frame means and cooperating with the first and second shifting means for guiding the same for shifting movement in the respective plane, and manual operating means extending with an operating portion thereof beyond the frame means and being operatively connected to the first and second shifting means for shifting the same independent of each other between an operating position in which a cassette carried by the respective shifting means is at least partly located beneath the exposure area and a shielded position in which the cassette is located completely behind the shielding means.

Preferably, the shielding means comprise front shielding means and rear shielding means carried by the frame means spaced a given distance from each other in the aforementioned first plane and defining between themselves an exposure area having a width equal to said given distance, wherein the front shielding means has a width at least equal to that of the exposure area and the rear shielding means has a width which is a multiple of that of the exposure area. The serialograph preferably also includes a parallel grid carried by the frame means and covering the exposure area. In this arrangement an additional shielding means is provided which is carried by the first shifting means beneath the whole area covered by the cassette carried thereby.

The arrangement preferably also includes releasable locking means cooperating with the first and the second shifting means for releasably locking each of the shifting means in an initial position in which the first and second shifting means are vertically aligned with each other with the leading portions of the cassettes carried thereby located beneath the exposure area and for releasably locking the respective shifting means after shifting the same from the initial position through a distance equal to the width of the exposure area.

In a preferred arrangement of the present invention, the rear shielding means include a first rear shielding means fixedly carried by the frame means and having a width at least equal to the width of the cassettes respectively carried by the first and second shifting means, and a second rear shielding means having a width substantially equal to half of the width of the casettes. In this case the exposure area has a width equal to the full width of the cassettes to be used in the apparatus whereas the front shielding means has a width at least half of the width of the cassettes. The second rear shielding means which is removably carried on the frame means may be placed on the frame means with the rear edge of the second rear shielding means vertically aligned with the front edge of the first shielding means so as to cover half of the wide exposure area and to leave only a reduced exposure area of a width half of the width of the cassettes unshielded.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a sectional top view of the serialograph of the present invention, the section being taken along the line 1—1 of FIG. 2 and viewed in the direction of the arrows;

FIG. 3 is a front view of FIG. 1;

FIG. 5 is an exploded view of the frame means and the shielding means carried thereby; and FIGS. 6–9 are schematic views showing the position of the first and second shifting means during successive exposures of the cassettes carried thereby.

Figure 2:
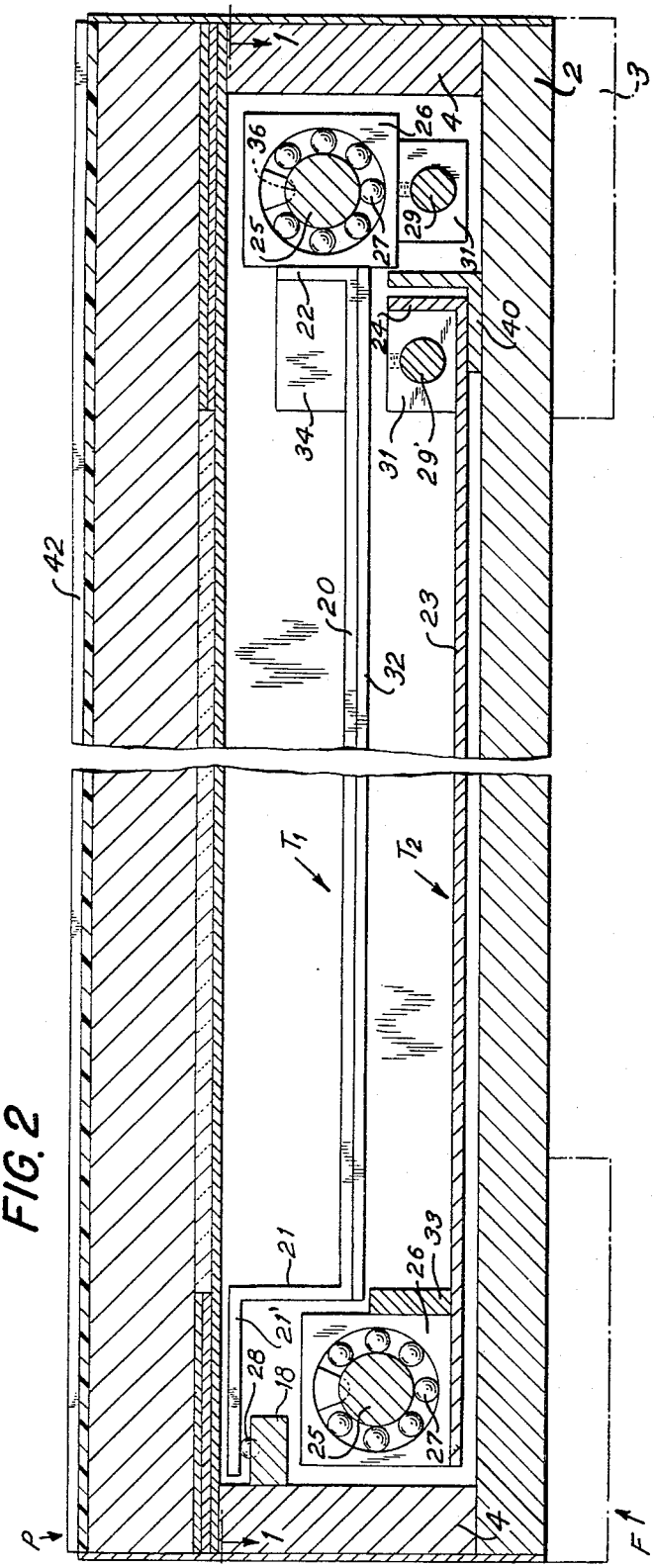
FIG. 2 is a sectional view taken along the line 2—2 of FIG. 1 and viewed in the direction of the arrows.
Figure 4:
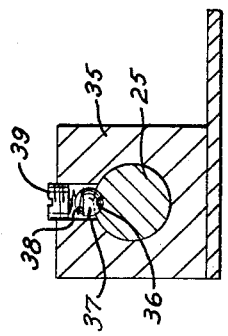
FIG. 4 is a partial sectional view taken along the line 4—4 of FIG. 1 and being drawn to an enlarged scale.

Referring now to the drawings, and more particularly to FIGS. 1–5 of the same, it will be seen that the serialograph of the present invention comprises frame means F which include, as best shown in the exploded view of FIG. 5 a bottom plate 2, and two downwardly extending short bars 3 attached to the front edge of plate 2. The bars 3 are adapted to abut against the front edge of an X-ray table on which the patient to be X-rayed is adapted to rest to properly align the frame means of the serialograph with the table. The frame means F include further a pair of side wall members 4, and which are respectively attached to opposite sides of the bottom plate 2, upwardly extending from side portions of the bottom plate 2. A pair of short plates 6 and 6' are attached to opposite ends of the right side wall 4, as viewed in FIG. 5, extending substantially normal and inwardly from the right side wall 4. A pair of corresponding plates 5 are attached to the left side wall 4, as viewed in FIG. 5 extending substantially normal and inwardly therefrom. A rear wall 7 extends between the inner ends of the rear plates 5 and 6'. All the aforementioned portions of the frame means are preferably formed from wood and fastened to each other by wood screws or the like. A bar 18 as shown in FIG. 2 is fixed to the left side wall 4, as viewed in FIG. 2 projecting inwardly therefrom slightly below the top face of the left side wall 4. Plate means P extend over the area defined between the side walls 4 and these plate means comprise as best seen in the exploded view of FIG. 5 a sheet 8 preferably of aluminum of a thickness of about $\frac{1}{16}$ of an inch, shielding means S comprising front shielding means 9, rear shielding means 11 spaced from the front shielding means and connected to the latter at opposite ends thereof by strip-shaped side shielding means 10. The front, rear and side shielding means 9, 10 and 11 are formed from sheet of lead of a thickness of about $\frac{1}{16}$ of an inch. The inner edges of the front, rear, and side shielding means define a rectangular exposure area E. Superimposed upon the shielding means S is a sheet of aluminum of a thickness of about $\frac{1}{16}$ of an inch having a front portion 13, a pair of side portions 14 and a rear portion 15 which have substantially the same dimensions as the front shielding means 9, the side shielding means 10 and the rear shielding means 11, respectively. A parallel grid 12 of known construction is located in the open space defined by the shielding means and by the cutout in the aluminum sheet superimposed thereupon so that the parallel grid 12 extends over the whole exposure area E. A wooden plate 16 of a thickness of about $\frac{3}{4}$ of an inch is superimposed upon the aluminum sheet 13–15 and the whole assembly is covered by a thin sheet 17 of plastic material, for instance Bakelite. The aforementioned sheets and plates are connected together and to the side walls 4, the rear wall 7 and the small plates 5, 6, 6' by wood screws or the like.

If the apparatus is used with cassettes having X-ray films of a size 14 x 36", the front shielding means 9 are spaced from the rear shielding means 11 a distance about equal or slightly larger than the width of the X-ray film and the width of the exposure area may for instance be 15" and the length thereof slightly greater than the length of the X-ray film to be used in the apparatus and be for instance 37". The width of the front shielding means 9 is preferably slightly greater than half of the width of the film to be used and the width of the front shielding means 9 may for instance be 8¼". The width of the rear shielding means 11 is chosen to be slightly greater than the width of the film to be used and this width may for instance be 15¾". A line 17a is marked on the top sheet 17 extending parallel to the front edge of the sheet and spaced therefrom a distance equal to the width of the front shielding means 9 plus half the width of the exposure area E for a purpose as will be explained later on.

Two trays or shifting means $T_1$ and $T_2$ are mounted on the frame means F above described superimposed upon each other in the space between the bottom plate 2 and the top plate assembly P shiftable in longitudinal direction of the frame means F. The upper tray $T_1$ has a horizontally extending plate portion 20 and along the side edges thereof upwardly extending flange portions 21 and 22. A horizontally extending flange portion 21' is integrally connected to the upper edge of the left flange portion 21, as viewed in FIG. 2 and the bottom surface of the horizontally extending flange portion 21' rides on a plurality of balls 21 received in recesses of the guide member 18 which is fixedly connected to the left side wall 4, as viewed in FIG. 2. Two blocks 26 are fixedly connected in any suitable manner to the right, as viewed in FIG. 2, upwardly extending flange 22 and each of the blocks 26 carries a split ball bushing 27. The balls of the bushing 27 rollingly engage a rod 25 extending parallel to the flange 22 through appropriate bores in the plates 6 and 6' and being fixedly connected thereto in any suitable manner. The upper tray $T_1$ is therefore guided for movement in longitudinal direction of the frame means F by guide means constituted on the one hand by the balls 28 arranged in the guide member 18, and on the other hand by the rod 25 rollingly engaged by the balls of the bushing 27. The upper tray $T_1$ is preferably made from aluminum sheet which may have a thickness of $\frac{1}{16}$ of an inch. Fixed to the horizontal portion 20 of the upper tray $T_1$ is a sheet of lead 32 which may also have a thickness of $\frac{1}{16}$ of an inch and which forms an additional shielding means for a purpose as will be described later on.

The lower tray $T_2$ has a horizontally extending bottom portion 23 and a flange 24 projecting upwardly from the right side edge, as viewed in FIG. 2, of this bottom portion. A pair of spaced blocks 26 are fixedly connected to the left marginal portion, as viewed in FIG. 2, of the bottom plate portion 23 and each of the blocks 26 carries again a split ball bushing 27, the balls of which rollingly engage a rod 25 which extends parallel to the left side wall 4, as viewed in FIG. 2, of the frame means F through appropriate openings in the plates 5 and being fixedly connected thereto in any suitable manner. The right edge portion, as viewed in FIG. 2, of the plate 23 and the upright flange 24 are guided on an elongated bar 40 of L-shaped cross section fixed in any convenient manner to the bottom plate 2 of the frame means. The bar 40 and the left rod 25 engaged by the balls of the bushing 27 form guide means for guiding the lower tray $T_2$ in longitudinal direction.

Manual operating means are fixedly connected to the trays $T_1$ and $T_2$ for shifting the same in longitudinal direction along the aforementioned described guide means. The operating means for the tray $T_1$ comprises an elongated rod 29 extending through appropriate bores of blocks 31 and fixedly connected thereto by set screws or the like. The blocks 31 are fixedly connected by any suitable means to the bottom surfaces of the blocks 26 and the rod 29 projects with the front portion thereof, even when the tray $T_1$ is pushed all the way to the rear of the frame means F as shown in FIG. 1, with an end portion thereof forwardly beyond the front edge of the frame means F and the front end of the rod 29 is bent upwardly at 29'', as best shown in FIG. 3, and carries at its upper free end a rounded button 30 so that it can be conveniently gripped by the operator. The operating means for the lower tray $T_2$ comprise a rod 29' extending through appropriate bores of spaced blocks 31 and fixedly connected thereto by set screws or the like and the blocks 31 are fixed in any convenient manner to the right flange 24 of the tray $T_2$. The rod 29' extends likewise beyond the front edge of the frame means F and the front portion thereof is bent upwardly at 29'' as shown in FIG. 3 and carries at its free upper end thereof a rounded button 30.

The arrangement includes further releasable locking means for the trays $T_1$ and $T_2$. Each of the releasable locking means comprises a block 35 formed with a bore therethrough in which the respective rod 25 is slidably guided. Each of the blocks 35 is formed with an additional bore extending transverse to the bore in which the rod 25 is guided and which houses a ball 37 engaged by a coil spring 38 which is backed up at its outer end by a set screw 39 screwed into a threaded portion of the last mentioned bore so that the ball 37 is pressed against a surface portion of the rod 25. The blocks 35 are connected to the respective trays $T_1$ and $T_2$ so that the balls 35 are located exactly midway between the front and rear edge of the respective tray, and the rods 25 are formed along the lines contacted by the balls 37 during movement of the trays in longitudinal direction of the rods 25 with a plurality of cavities 36 preferably in the form of a spherical segment so that the balls may snap in the respective cavity to thereby releasably lock the respective tray in a fixed position.

An elongated spacer bar 33 is fixed to the blocks 26 of the lower tray $T_2$ which spacer bar 33 has an inner surface vertically aligned with the inner surface of the flange 21 of the upper tray $T_1$ and a corresponding spacer block 34 is fixed to the flange 22 of the upper tray $T_1$ and having an inner surface vertically aligned with the inner surface of the blocks 31 on the lower tray $T_2$ so that cassettes placed on the bottom plate 20 of the upper tray $T_1$ and on the bottom plate 23 of the lower tray $T_2$ will be vertically aligned with each other.

In addition to the first mentioned rear shielding means 11 which form part of the top plate assembly P, the arrangement preferably also includes second rear shielding means 42 having a width $b$ equal to half of the width $a$ of the exposure area E and adapted to be placed on the uppermost sheet 17 of the top plate assembly B with the front edge thereof aligned with the aforementioned line 17a marked on the top sheet 17. The rear edge of the shielding means 42 will then be aligned with the front edge of the first mentioned rear shielding means 15 so as to leave only a reduced exposure area having a width $b$ between the rear edge of the front shielding means 9 and the front edge of the second rear shielding means 42 uncovered. The shielding means 42 is constituted by a sheet of lead of a thickness of approximately 1/16 of an inch and strips of rubber may be provided on the bottom surface of the lead sheet 42 along lateral portions thereof to prevent shifting of the lead sheet 42 on the top sheet 17.

The serialograph above described is operated in a manner as will now be described with reference to FIGS. 6–9. The serialograph S is placed on a table with the bars 3 fixed to the bottom plate 2 of the frame means of the serialograph abutting against the front edge of the table as shown in FIG. 6 so that the serialograph is properly positioned with regard to the lower end of an X-ray apparatux X as schematically shown in FIGS. 6–9. As can be seen in these figures the center line of the X-ray apparatus X is aligned with the center of the reduced exposure area, that is the area left unshielded between the rear edge of the front shielding means 9 and the front edge of the second rear shielding means 42. Cassettes $C_1$ and $C_2$ are respectively placed in the trays $T_1$ and $T_2$ and these trays are positioned vertically aligned with each other so that the leading edge of each cassette is vertically aligned with the front edge of the second shielding means 42. In other words, the rear half of each cassette $C_1$ and $C_2$ is located beneath the reduced exposure area E' defined between the rear edge of the front shielding means 9 and the front edge of the shielding means 42. The lower cassette is however shielded in this position by the additional shielding means 32 carried by the upper tray $T_1$.

If successive X-rays of a portion of the body of the patient have to be taken the patient is placed on the top plate of the serialograph S, and if for instance the leg of the patient has to be X-rayed the patient is positioned on the top plate of the serialograph as shown in FIGS. 6–9 so that the leg of the patient extends over the reduced exposure area E'. A first exposure is then made on half of the film in the cassette $C_1$ on the tray $T_1$ while the two trays are positioned as shown in FIG. 6. After the first exposure is made, the operator will grip the handle portion of the operating rod 29 connected to the tray $T_1$ and push the upper tray $T_1$ toward the rear wall 7 of the serialograph whereby the ball 37 of the locking means of the upper tray $T_1$ will be disengaged from the corresponding cavity 36 formed in the respective rod 25 until the upper tray is positioned as shown in FIG. 7 in which position the ball 37 will snap in the next cavity 36 on the corresponding rod 25 to releasably lock the upper tray $T_1$ in the position as shown in FIG. 7. In this position the second exposure on the front half on the film carried by the cassette $C_1$ is taken. After the second exposure is made, the upper tray $T_1$ and the cassette $C_1$ carried thereby is pushed again rearwardly to the position shown in FIG. 8 and releasably locked in this position by engagement of the ball 37 of the respective locking means in the next cavity 36 in the appropriate rod 25. In the position as shown in FIG. 8 the rear half of the cassette $C_2$ carried by the lower tray $T_2$ is aligned with the reduced exposure area E' so that a third exposure can now be made on the rear half of the film carried by the cassette $C_2$. After the third exposure is made the operator will push the rod 29' connected to the lower tray $T_2$ inwardly releasing thereby the ball of the releasable locking means cooperating with the tray $T_2$ until the ball 37 snaps in the next cavity 36 in the corresponding rod 25 in which the lower cassette will be positioned as shown in FIG. 9 so that the front half of the film carried by the lower cassette $C_2$ may be exposed.

With this arrangement it is therefore possible to make four exposures in quick succession and after the exposures are finished the two trays $T_1$ and $T_2$ are pulled forwardly by the rods 29 and 29' to the positions as shown in FIG. 6 so that the cassettes carried thereby can be easily removed therefrom.

The serialograph of the present invention can also be used for making two exposures in quick succession and each exposure over the whole width of films respectively carried by the cassettes $C_1$ and $C_2$. If such exposures over the whole width of the films are desired, the second shielding means 42 is removed from the top plate of the serialograph, the X-ray apparatus X is position substantially at the center of the wide exposure area E and the two trays $T_1$ and $T_2$ are positioned superimposed with each other so that the rear edge of each tray is vertically aligned with the front edge of the first rear shielding means 11. The first exposure is then made over the whole width of the film carried by the cassette $C_1$, whereby the film in the lower cassette $C_2$ is shielded by the additional shielding means 32 carried by the upper tray $T_1$ and after the first exposure is made the upper tray $T_1$ is pushed by the operating rod 29 all the way to the rear of the serialograph so that the upper cassette $T_1$ is shielded by the first rear shielding means 11 while the lower cassette $C_2$ is now located unshielded beneath the exposure area E so that a second exposure over the whole width of the film carried by the cassette C₂ may be made.

It will be understood that each of the elements described above, or two or more together, may also find a useful application in other types of serialographs differing from the types described above.

While the invention has been illustrated and described as embodied in a serialograph, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a serialograph, in combination, frame means; shielding means having an area at least equal to that of a cassette to be used in said serialograph and being carried by the frame means extending in a first plane, said frame means defining laterally of said shielding means an exposure area;

first shifting means adapted to carry a cassette and being mounted in said frame means in a second plane parallel to said first plane;

second shifting means adapted to carry a second cassette and being mounted in said frame means in a third plane parallel to said second plane;

guide means on said frame means and cooperating with said first and second shifting means for guiding the same for shifting movement in the respective plane;

and manual operating means extending with an operating portion thereof beyond said frame means and being connected to said first and said second shifting means for shifting the same independent of each other between an operating position in which a cassette carried by the respective shifting means is at least partly located beneath said exposure area and a shielded position in which the cassette is located completely behind said shielding means.

2. In a serialograph, in combination, frame means: front shielding means and rear shielding means carried by said frame means spaced a given distance from each other substantially in a first plane and defining between themselves an exposure area having a width equal to said given distance, said front shielding means having a width at least equal to that of said exposure area and said rear shielding means having a width which is a multiple of that of said exposure area;

a parallel grid carried by said frame means and covering said exposure area;

first shifting means adapted to carry a first cassette having a width which is a multiple of that of said exposure area, said first shifting means being mounted on said frame means in a second plane beneath and parallel to said first plane;

additional shielding means carried by said first shifting means beneath the whole area covered by a cassette carried thereby;

second shifting means adapted to carry a second cassette having a width which is a multiple of that of said exposure area, said second shifting means being arranged in a third plane beneath and parallel to said second plane;

guide means on said frame means and cooperating with said first and said second shifting means for guiding the same for shifting movement in the respective plane; and manual operating means extending with an operating portion thereof beyond said frame means and being connected to said first and said second shifting means for shifting the same independent of each other in the respective plane, whereby when said first and second shifting means are vertically aligned with each other in an initial position with the leading portions of the cassette carried thereby located beneath said exposure area, a series of exposures may be made in quick succession by shifting after each exposure first said first shifting means through increments equal to said given distance toward said rear shielding means while said second cassette will be shielded from exposure by said additional shielding means and by subsequently shifting said second shifting means in the same direction through increments equal to said given distance.

3. In a serialograph as set forth in claim 2, wherein each of said shifting means comprises a tray having opposite side edges, and wherein said guide means comprise a guide rod for each tray extending parallel to one of said side edges of the respective tray fixed at opposite ends thereof to said frame means, a pair of bushing fixedly spaced from each other to said one side edge of the respective tray and guided on the respective guide rod, and an elongated member fixedly carried by said frame means parallel to the other side edge of the respective tray and supporting the latter along the other side edge thereof.

4. In a serialograph as set forth in claim 3, wherein said bushings are ball carrying bushings, with the balls of the bushing rollingly engaging the respective guide rod.

5. In a serialograph as set forth in claim 3, wherein said guide rods extend along opposite sides of said frame means.

6. In a seriolograph as set forth in claim 3, wherein said manual operating means comprise an elongated rod for each tray fixed at one end thereof to the respective tray in the region of one of the side edges thereof, projecting forwardly therefrom beyond said frame means and having at the free end thereof an upwardly extending handle portion.

7. In a serialograph as set forth in claim 6, wherein the elongated rods of said first and said second shifting means are both arranged at the same side of said frame means.

8. In a serialograph as set forth in claim 3, and including releasable locking means for said first and said second shifting means and cooperating with said guide rods for releasably locking each of said shifting means in said initial position and after each shifting from said initial position through a distance equal to the width of said exposure area.

9. In a serialograph as set forth in claim 8, wherein said guide rods are formed with a plurality of cavities spaced at said given distance from each other and wherein said releasable locking means comprise a ball lock fixed to said one side edge of each tray and having a spring pressed ball adapted to releasably engage into said cavities, respectively.

10. In a serialograph, in combination, frame means; front shielding means and rear shielding means carried by said frame means spaced a given distance from each other substantially in a first plane and defining between themselves an exposure area having a width equal to said given distance, said front shielding means having a width at least equal to that of said exposure area and said rear shielding means having a width which is at least twice the width of said exposure area;

a parallel grid carried by said frame means and covering said exposure area;

first shifting means adapted to carry a first cassette having a width which is at least twice the width of said exposure area, said first shifting means being mounted on said frame means in a second plane beneath and parallel to said first plane;

additional shielding means carried by said first shifting means beneath the whole area covered by a cassette carried thereby;

second shifting means adapted to carry a second cassette having a width which is equal to that of first cassette, said second shifting means being arranged in a third plane beneath and parallel to said second plane;

guide means on said frame means and cooperating with said first and said second shifting means for guiding the same for shifting movement in the respective plane; and manual operating means extending with an operating portion thereof beyond said frame means and being connected to said first and said second shifting means for shifting the same independent of each other in the respective plane, whereby when said first and second shifting means are vertically aligned with each other in an initial position in which half of each cassette is located beneath said exposure area and the other half beneath said front shielding area, a first exposure may be made on one half of the first cassette carried by said first shifting means, a second exposure may be made on the other half of the first cassette after shifting said first shifting means through a distance equal to said given distance toward said rear shielding means, a third exposure may be made on one half of the second cassette carried by said second shifting means after shifting said first shifting means in the same direction against a distance equal to said given distance, and a fourth exposure may be made on the other half of said second cassette by shifting said second shifting means toward said rear shielding means a distance equal to said given distance, so that four exposures may be made in quick succession by shifting said first and said second shifting means successively in the same direction through increments equal to said given distance.

11. In a serialograph, in combination, frame means; front shielding means and first rear shielding means carried by said frame means spaced a given distance from each other substantially in a first plane and defining between themselves a wide exposure area of a width equal to said given distance, said front shielding means having a width at least half of that of said wide exposure area and said first rear shielding means having a width at least equal to that of said wide exposure area; a parallel grid carried by said frame means between said front and said first rear shielding means and covering said wide exposure area; a second rear shielding means having a width equal to half the width of said wide exposure area and being removably carried on said frame means over said parallel grid with its rear edge aligned with the front edge of said first rear shielding means to leave a reduced exposure area of a width equal to half the width of said wide exposure area unshielded; first shifting means adapted to carry a first cassette having a width which is substantially equal to that of said wide exposure area, said first shifting means being mounted on said frame means in a second plane beneath and parallel to said first plane;

additional shielding means carried by said first shifting means beneath the whole area covered by a cassette carried thereby;

second shifting means adapted to carry a second cassette having a width which is equal to that of first cassette, said second shifting means being arranged in a third plane beneath and parallel to said second plane;

guide means on said frame means and cooperating with said first and said second shifting means for guiding the same for shifting movement in the respective plane; and manual operating means extending with an operating portion thereof beyond said frame means and being connected to said first and said second shifting means for shifting the same independent of each other in the respective plane, whereby when said second rear shielding means is placed on said frame means to leave only said reduced exposure area unshielded and when said first and second shifting means are vertically aligned with each other in an initial position in which the leading portions of the cassettes carried thereby are located beneath said reduced exposure area, a series of exposures may be made in quick succession by shifting after each exposure first said first shifting means through increments equal to the width of said reduced exposure area toward said rear shielding means and by subsequently shifting said shifting means in the same direction through the same increments, while when said second rear shielding means are removed, two exposures over the whole width of each cassette may be made by shifting after the first exposure said first shifting means through an increment equal to said given distance toward said rear shielding means.

12. In a serialograph, in combination, frame means; front shielding means and rear shielding means carried by said frame means spaced a given distance from each other substantially in a first plane and defining between themselves an exposure area having a width equal to said given distance, said front shielding means having a width at least equal to that of said exposure area and said rear shielding means having a width which is a multiple of that of said exposure area;

first shifting means adapted to carry a first cassette having a width which is a multiple of that of said exposure area, said first shifting means being mounted on said frame means in a second plane beneath and parallel to said first plane;

additional shielding means carried by said first shifting means beneath the whole area covered by a cassette carried thereby;

second shifting means adapted to carry a second cassette having a width which is a multiple of that of said exposure area, said second shifting means being arranged in a third plane beneath and parallel to said second plane;

guide means on said frame means and cooperating with said first and said second shifting means for guiding the same for shifting movement in the respective plane;

manual operating means extending with an operating portion thereof beyond said frame means and being connected to said first and said second shifting means for shifting the same independent of each other in the respective plane, whereby when said first and second shifting means are vertically aligned with each other in an initial position with the leading portions of the cassettes carried thereby located beneath said exposure area, a series of exposures may be made in quick succession by shifting after each exposure first said first shifting means through increments equal to said given distance toward said rear shielding means while said second cassette will be shielded from exposure by said additional shielding means and by subsequently shifting said second shifting means in the same direction through increments equal to said given distance; and releasable locking means cooperating with said first and second shifting means for releasably locking each of said shifting means in said initial position and after each shifting from said initial position through a distance equal to the width of said exposure area.

(References on following page)

References Cited

UNITED STATES PATENTS

| | | | |
|---|---|---|---|
| 965,195 | 7/1910 | Kelley | 250—66 X |
| 1,977,770 | 10/1934 | Lee | 250—66 |
| 2,004,232 | 6/1935 | Weed | 250—66 |
| 2,107,825 | 2/1938 | Humphreys | 250—66 |
| 2,617,944 | 11/1952 | Sanchez-Perez | 250—66 |
| 2,680,199 | 6/1954 | Abel | 250—66 |
| 2,795,702 | 6/1957 | Morris | 250—66 |
| 2,832,893 | 4/1958 | Camardella | 250—66 |
| 3,188,466 | 6/1965 | Jimenez | 250—66 |

FOREIGN PATENTS

| | | |
|---|---|---|
| 430,838 | 6/1926 | Germany. |

WILLIAM F. LINDQUIST, *Primary Examiner.*

RALPH G. NILSON, *Examiner.*